United States Patent [19]

Ikeda et al.

[11] 4,110,267
[45] Aug. 29, 1978

[54] EXPANDABLE ETHYLENICALLY UNSATURATED POLYMER PARTICLE COMPOSITIONS

[75] Inventors: Toshiki Ikeda; Yoshitsugu Beppu, both of Shiga, Japan

[73] Assignee: Sekisui Kaseihin Kogyo Kabushiki Kaisha, Nara, Japan

[21] Appl. No.: 596,854

[22] Filed: Jul. 17, 1975

[30] Foreign Application Priority Data

Aug. 23, 1974 [JP] Japan ................................ 49-97282
Oct. 19, 1974 [JP] Japan ............................... 49-120560

[51] Int. Cl.$^2$ ................................................ C08J 9/00
[52] U.S. Cl. ........................................ 521/57; 521/84; 521/89; 521/97
[58] Field of Search .............. 260/2.5, 2.5 H, 2.5 HA, 260/2.5 HB, 2.5 E, 2.5 B

[56] References Cited

U.S. PATENT DOCUMENTS

| 3,086,885 | 4/1963 | Jahn | 264/DIG. 9 |
|---|---|---|---|
| 3,151,192 | 9/1964 | Jacobs et al. | 260/2.5 E |

FOREIGN PATENT DOCUMENTS

| 210,728 | 10/1957 | Australia | 260/2.5 E |
|---|---|---|---|
| 1,052,289 | 12/1966 | United Kingdom | 260/2.5 E |

OTHER PUBLICATIONS

Jour. of the Society of Rubber Industry, Japan, vol. 34, pp. 928–940, (1961); vol. 36, pp. 295–303, (1963); vol. 34, pp. 89–91 (1961).

*Primary Examiner*—J. Ziegler
*Attorney, Agent, or Firm*—Armstrong, Nikaido, Marmelstein & Kubovcik

[57] ABSTRACT

Expandable ethylenically unsaturated polymer particle compositions containing an expanding agent, said polymer particles having the surfaces thereof coated with a layer of a compound comprising calcium carbonate having a particle size of from 0.02 to 0.2 microns and the surfaces of said calcium carbonate particles having chemically attached thereto organic compounds selected from the group consisting of higher fatty acids, resin acid, lignin sulfonic acid and mixtures thereof.

16 Claims, No Drawings

EXPANDABLE ETHYLENICALLY UNSATURATED POLYMER PARTICLE COMPOSITIONS

BACKGROUND OF THE INVENTION

In general, expandable ethylenically unsaturated polymer particles are prepared by the following processes.

(1) Styrene polymer particles are impregnated in a suspension medium by adding a volatile aliphatic hydrocarbon which does not dissolve or may slightly swell the styrene polymer particles; examples of such hydrocarbons include n-pentene, n-hexane and n-heptane.

(2) Styrene polymer particles are added to an aqueous suspension, emulsified with a small amount of solvent which dissolves the styrene polymer particles; examples of such solvents include benzene, toluene, xylene, carbon tetrachloride and tetrachloroethylene. The polymer particles are impregnated by adding an expanding agent which is gaseous under ordinary conditions, e.g. at room temperature and atmospheric pressure; examples of such expanding agents include propane, butane, vinyl chloride and iso-butane.

(3) Methacrylic acid ester copolymer particles consisting of from 99.5 to 95 % by weight of methacrylic acid ester and from 0.5 to 5 % by weight of α-methylstyrene, are impregnated by adding an expanding agent such as n-butane, n-heptane, cyclopentane and cyclohexane, at a temperature higher than the softening point of the said polymer particles and in the presence of a small amount of solvent such as halogenated hydrocarbons such as methylene chloride, 1, 2-dichloropropane and tri-chloroethylene.

(4) Ethylene polymer particles and a solution containing a cross-linking agent selected from dicumul peroxide, 2,5-dimethyl-2,5-di-(t-butylperoxy)hexene-33, t-butyl hydroperoxide, cumene hydroperoxide and t-butyl peroxyisopropyl carbonate prepared in a solvent which can dissolve said polymer particles such as trichloroethylene, tetrachloroethylene, benzene, toluene and xylene, are admixed to form a suspension medium and said polymer particles are cross-linked and impregnated with an expanding agent such as n-butane, n-pentane, n-hexane and cyclohexane. The cross-linking and impregnation are carried out at the same time at the decomposition temperature of the cross-linking agent.

Expandable ethylenically unsaturated polymer particles obtained by means of the above processes are employed as materials for cellular shaped articles such as cups, packaging materials, insulation boards for refrigerators and structural components, etc.

The method of producing cellular shaped articles from expandable ethylenically unsaturated polymer particle is well known. Said polymer particles are expanded previously under heat to produce pre-expanded polymer particles, and the resulting pre-expanded polymer particles are then fed into a mold cavity having a plurality of perforations on the walls thereof, the shape of the mold cavity determining the shape of resulting articles. Said pre-expanded polymer particles are then heated, at a temperature above their softening point by means of suitable heating media, i.e., steam through the perforations, to let said polymer particles expand and fuse together to form cellular shaped articles, and after cooling the cellular shaped articles are removed from the mold cavity.

The surfaces of the expandable ethylenically unsaturated polymer particles have some restrictions in their production. That is, when impregnating an expanding agent, e.g. a volatile hydrocarbon and, especially, one having a high affinity for ethylenically unsaturated polymer particles such as n-pentane and n-hexane, into said polymer particles, the surfaces of said particles are softened and, as a result, the heat resistance of the particles is lowered. There is a tendency for the polymer particles to agglomerate, or to lump, (wherein "agglomerate" means the sticking together of a few particles and "lump" means the sticking together of agglomerated particles) when using a small amount of a solvent in the expandable ethylenically polymer particles in order to shorten the period of pre-expension. This is because the surfaces of the polymer particles become very soft by the action of the solvent, and therefore, the polymer particles tend to agglomerate during the pre-expanding step of the particles when raising the temperature to a level higher than the softening point of the polymer particles.

Pre-expanded polymer particles are generally transfered through a pipe to a storage hopper in order to be dried and aged, and are then transfered to a mold cavity through pipes. Subsequently, the pre-expended polymer particles are fed into the mold cavity through mold nozzles connected to the pipes. If the pre-expanded polymer particles include agglomerated particles or lumps, the particles tend to clog or plug the pipes and-/or nozzles and, as a result, pre-expanded polymer particles are not transfered smoothly. Furthermore, feeding the mold cavity with such pre-expanded polymer particles can not be carried out effectively when the pipes and/or nozzles are clogged or plugged.

For the above reasons, expandable ethylenically unsaturated polymer particles are needed which do not agglomerate or lump during the pre-expanding step. In order to prepare expandable ethylenically unsaturated polymer particles which do not agglomerate or lump during the pre-expanding step, it is known that surfaces of ethylenically unsaturated polymer particles or expandable ethylenically unsaturated polymer particles are coated with a small amount of talc powder, wax, heavy metal soap such as zinc stearate and silicon oil; amorphous hydrated calcium silicon aluminate as taught in U.S. Pat. No. 3,444,104; and a fluid siloxane polymer as taught in U.S. Pat. No. 3,086,885. It is also known to coat the polymer particles with a small amount of kaolin clay, with a small amount of a mixture containing two particular types of surface active amides, namely, (1) a cationic normally solid, higher fatty acid amido- or resin acid amido- propyl-hydroxyalkyl quaternary nitrogen compound and (2) a nonioic, normally solid, polyethoxylated fatty acid amide, as taught in U.S. Pat. No. 3,301,812. Expandable ethylenically unsaturated polymer particles treated with the above coating agents can prevent agglomeration or lumping of the polymer particles in the pre-expanding step. However, it is difficult to get good cellular shaped articles from the above coated polymer particles when feeding them into the mold cavity and subsequently heating them to a temperature above the softening point of the polymer particles. Such difficulties arise, since the fusibility of the pre-expanded polymer particles are substantially decreased due to the effect of the coating agent which is primarily intended to prevent agglomeration or lumping of the polymer particles. Under such circumstances, expandable ethylenically unsaturated polymer particles are needed which have both the properties of not agglomerating or lumping during the pre-expanding step and providing good fusibility during the molding step.

DETAILED DESCRIPTION

During the investigation for improving the undesirable effects of the above polymer particles, we have found that improved expandable ethylenically unsaturated polymer particle compositions which do not agglomerate or lump during the pre-expanding step and readily fuse during the molding step may be obtained by coating the surfaces of expandable ethylenically unsaturated polymer particles with a layer of a compound comprising calcium carbonate particles having chemically attached thereto organic compounds.

This invention relates to expandable ethylenically unsaturated polymer particles comprising ethylenically unsaturated polymer particles containing an expanding agent consisting of a hydrocarbon which is gaseous or liquid at ordinary conditions and which does not dissolve or may slightly swell the said polymer particles and also has a boiling point lower than the softening point of the said polymer particles. The polymer particles have the surfaces thereof coated with a layer of calcium carbonate having a particle size of from 0.02 to 0.2 microns and the surfaces of said calcium carbonate particles have chemically attached thereto organic compounds.

Ethylenically unsaturated polymer particles of the present invention include following polymers; styrene or methacrylic acid ester polymers prepared from vinyl monomers such as styrene, methyl methacrylate, ethyl methacrylate, etc; styrene copolymers containing more than 50 % by weight of styrene and a monomer copolymerizable with styrene such as methyl acrylate, ethyl acrylate, butyl acrylate, methyl methacrylate, ethyl methacrylate, acrylonitrile, α-methylstyrene and vinylbenzene; methyl methacrylate copolymers containing more than 50 % by weight of methyl methacrylate and monomers copolymerizable with methyl methacrylate such as ethyl methacrylate, butyl methacrylate, 2-ethylhexyl methacrylate, butyl acrylate, 2-ethylhexyl acrylate, ethyl acrylate, vinyl acetate, 1,3-butadiene, styrene, α-methylstyrene and acrylonitrile; ethyl methacrylate copolymers containing more than 50 % by weight of ethyl methacrylate and a monomer copolymerizable with ethyl methacrylate such as methyl methacrylate, butyl methacrylate, 2-ethylhexyl methacrylate, butyl acrylate, 2-ethylhexyl acrylate, ethyl acrylate, vinyl acetate, 1,3-butadiene, styrene, α-methylstyrene and acrylonitrile. Furthermore, cross-linked ethylene polymer particles and ethylene polymer particles containing therein polymerized styrene monomer are also included within the scope of this invention. The styrene monomer is impregnated into the ethylene polymer particles and subsequently polymerized uniformly therein in the presence of a polymerization catalyst. The shape of the polymer particles may be cylindrical or spherical and the particle size may be from 0.2 to 3.0 mm in diameter and from 2 to 7 mm in diameter in the case of ethylene polymer particles.

Expandable ethylenically unsaturated polymer particles of the present invention are made from the above mentioned ethylenically unsaturated polymers and may be prepared according to the process described in U.S. Pat. Nos. 2,950,261, 2,983,692 or 2,893,963. Such particles may also be prepared by the process of impregnating the polymer particles made in accordance with the above process, with from 2 to 25 % by weight of a hydrocarbon expanding agent which is gaseous or liquid at ordinary conditions, does not dissolve or may slightly swell the said polymer particles and has boiling point lower than the softening point of the said polymer particles. Such hydrocarbons include aliphatic hydrocarbon such as propane, n-butane, isobutane, n-pentane, neopentane and isopentane; aliphatic cyclic hydrocarbons such as cyclopentane and cyclohexane and halogenated hydrocarbon such as dichlorofluoromethane, chlorotrifluoromethane, dichlorofluoromethane, chlorodifluoromethane, trichlorofluoromethane, methyl chloride and ethyl chloride.

According to the present invention, the surfaces of the expandable ethylenically unsaturated polymer particles are coated with calcium carbonate which, in turn, have chemically attached to the surfaces thereof an organic compound. As a result, an expandable ethylenically unsaturated polymer particle composition is formed.

Organic compounds which are attached on the surfaces of the calcium carbonate include saturated or unsaturated higher fatty acids having from 10 to 20 carbon atoms such as capric acid, lauric acid, myristic acid, palmitic acid, stearic acid, palmitoic acid, oleic acid, linolic acid, linoleic acid, etc: resin acid and lignin sulphonic acid. Resin acid useful in the present invention is a major component of rosin. In general, rosin comprises a major amount, e.g. 80 % to 97%, or resin acid and a minor amount, e.g. 20 % to 3 %, of non-acidic components. The resin acid contains aliphatic cyclic acids and aromatic acids especially diterpenic acid ($C_{19}H_{29}COOH$) as the main component. Diterpenic acid is a mono-carbonic acid of an alkylated hydrophenanthrene nucleous having two double bonds, and consists of the abietic acid type and pimaric acid type. It is to be understood, however, that the composition of the resin acid may vary according to the type and source of resin acid. As an example of the composition of one type of resin acid, the following is illustrative:

| | |
|---|---|
| abietic acid | 30 – 40 % |
| neoabietic acid | 10 – 20 % |
| dihydroabietic acid | 14 % |
| tetrahydroabietic acid | 14 % |
| d-pimaric acid | 8 % |
| iso-d-pimaric acid | 5 % |
| dehydroabietic acid | 5 % |
| levopimaric acid | 0.1 % |

Calcium carbonate having an organic compound chemically attached to its surface as used in the present invention is believed to have the organic compound, not physically, but chemically combined with the surface of the calcium carbonate grain, as suggested in Journal of the Society of Rubber Industry, Japan (Nippon Gomu-Kyokai-Shi), published by the Society of Rubber Industry, Japan (Nippin Gomu-Kyokai) vol. 34, p 928–940, 1961, and vol. 36, p 295–303, 1963. The exact mechanism, however, is not known. The organic compound chemically combined on the surface of the calcium carbonate grain is not separated by organic solvents such as benzene and toluene.

The process of chemically attaching the above organic compounds on the surface of the calcium carbonate may be carried out in accordance with the process described in Journal of the Society of Rubber Industry, Japan described above and the same Journal Vol. 34, p 89-91 (1961).

Such process generally includes:

A. Introducing carbon dioxide gas into a suspension containing calcium hydroxide and a small amount of an organic compound or its alkaline metal salt having a reactive group such as —COOH or —SO$_3$H, and to subsequently obtain calcium carbonate having chemically attached to the surface thereof an organic compound.

B. Adding a small amount of an alkaline metal salt of an organic compound having a reactive group such as —COOH or —SO$_3$H to a suspension medium containing calcium carbonate, the calcium carbonate being prepared by introducing carbon dioxide to the suspension medium of calcium hydroxide, and to obtain calcium carbonate which has chemically attached to the surface thereof an organic compound.

Calcium carbonate having chemically attached to the surface thereof an organic compound may also be prepared by adding sodium carbonate instead of introducing carbon dioxide in the process of A) or B) above, in the presence of the organic compound.

Apart from A) and B) above, calcium carbonate having its surface coated with an organic compound, which is prepared by mixing together a small quantity of an organic compound and fine pulverized calcium carbonate, is not suitable in this invention, since the organic compound can not be chemically attached to the surface of calcium carbonate, and the resulting compound does not prevent agglomeration.

Calcium carbonate having an organic compound chemically attached to its surface, may be prepared according to this invention by the following processes; reacting 1-9 parts by weight of an organic compound or its sodium salt with 100 parts of calcium hydroxide and then introducing carbon dioxide; introducing carbon dioxide into calcium hydroxide to produce calcium carbonate, and then adding a sodium salt of an organic compound. It is preferred that the calcium carbonate of the invention have a particle size of from 0.02 to 0.2 microns and that the surfaces of said calcium carbonate particles have chemically attached thereto an organic compound.

The size of the above calcium carbonate particles of the present invention is very important in preparing the expandable ethylenically polymer particles. The size of the above calcium carbonate particles is preferred to be as small as possible. For example, when the calcium carbonate has a particle size of over 1 micron, agglomeration or lumping of the polymer particles can not be prevented. On the other hand, it is difficult to obtain commercially available calcium carbonate having a particle size smaller than 0.01 micron. From the above reasons, it is preferred that the particle size of the calcium carbonate be in the range from 0.02 to 0.2 microns in order to prevent agglomeration or lumping in the pre-expanding step and yet not disturb the fusing properties of the polymer particles during the molding step.

The amount of organic compound chemically attached on the surface of calcium carbonate is from 0.5 to 6 parts by weight, preferably from 1 to 5 parts by weight per 100 parts by weight of calcium carbonate. Calcium carbonate to the surface of which an organic compound may be chemically attached includes a complex salt of calcium carbonate and magnesium carbonate to the surface of which may be chemically attached an organic compound.

The coated calcium carbonate of the present invention is coated on expandable ethylenically polymer particles in an amount of from 0.005 to 0.3 parts by weight per 100 parts of said polymer particles. The calcium carbonate may be easily and uniformly coated on the surfaces of said polymer particles by, for example, mixing the said polymer particles and the coated calcium carbonate in a drum-blender, ribbon-blender, etc. In the case of coating the particles with less than 0.005% by weight of the coated calcium carbonate, agglomeration of the polymer particles occurs during the pre-expanding step and therefore, this is undesirable, and in the case of coating the particles with more than 0.3 % by weight, agglomeration of the polymer particles is substantially eliminated, but it is not preferable because such amounts tend to disturb the fusibility of the expanded polymer particles during the molding step. Preferable properties for the expandable ethylenically unsaturated polymer particles are obtained by coating the said polymer particles with from 0.01 to 0.1 % by weight of the coated calcium carbonate.

Expandable ethylenically unsaturated polymer particle compositions of the present invention, which polymer particles have the surfaces thereof coated with a layer of a compound comprising fine pulverized calcium carbonate having chemically attached to the surface thereof an organic compound of higher fatty acids such as palmitic acid and stearic acid, resin acids comprising abietic acid and levo-pimaric acid and alkaline metal salt of the above mentioned acids and alkaline metal salt of lignin sulfonic acid such as sodium lignin sulfonate, have the effect of preventing agglomeration or lumping of the polymer particles during the pre-expanding step, and further produces uniformly pre-expanded polymer particles having a low density. The composition of the present invention flows freely and does not stop up in the pipes and/or nozzles when being transfered by such means, and can form expanded ethylenically unsaturated polymer particles having low density and having a desired non-agglomerated or non-lumped form, since the composition can be fed smoothly in a mold cavity without stopping up. The coated polymer particles of the invention expand well and easily fuse to each other during the process of preparing cellular shaped articles by heating, swelling and fusing the pre-expanded polymer particles in a mold cavity. As stated above, the compositions of the present invention provide many desirable results which may also be commercially beneficial.

To determine the degree of fusibility of the polymer particles, the obtained cellular shaped article is raptured by bending pressure and thereafter, the degree of fusibility of said article is observed and measured at the rupture cross-section. In other words, the degree of fusibility depends on whether or not the surfaces of expanded particles are exposed at the rupture cross-section. For example, a 100 % degree of fusibility means that no surfaces of the expanded particles exist at the rupture cross-section. In consideration of practical use, it is desirable that the degree of fusibility be above 70 %, more desirably above 80 % and most desirably above 90 %.

The following examples are illustrative of the present invention but are not intended to limit the scope thereof.

EXAMPLE 1

(a) 1,000 ml of water and 100 g of calcium hydroxide were placed into a 2 l reaction vessel equipped with a stirrer, and then 3 g of a sodium salt of a resin acid containing abietic acid as a main component, were added into the mixture while stirring, and the stirring was continued for 30 minutes. While maintaining the produced suspension at 5°–6° C, carbon dioxide gas was introduced into the suspension at a rate of 8 1 per minute until the pH of the suspension solution was 7. The suspension was filtered and dried at room temperature. Calcium carbonate having resin acid chemically attached to the surface thereof and having an average particle size of from 0.04 to 0.15 microns was obtained.

(b) 0.6 g of the calcium carbonate having resin acid chemically attached to the surface thereof prepared by step above (a) was added to 1,000 g of expandable styrene polymer particles having a particle size of from 0.6 to 1.2 mm in diameter said polymer particles containing 6.5 % by weight of n-pentane as the expanding agent. The ingredients were uniformly mixed in a ribbon blender. Expandable styrene polymer particles coated with the above coated calcium carbonate were obtained.

The obtained expandable styrene polymer particle composition was uniformly heated to 99°–101° C in a batch type pre-expander provided with a wing stirrer, the heating being accomplished with a stream of steam, such pre-expansion being conducted at atmospheric pressure while stirring to produce pre-expanded polymer particles having a density of 0.0154. It was found that agglomerated and lumped pre-expanded particles were not observed when passing them through a sieve having a mesh opening of 5.6 mm, i.e., 3½mesh ASTM.

The pre-expanded polymer particles prepared by the above step, were aged for 12 hours at room temperature, and then fed into a cylindrical mold cavity of 100 mm in diameter and 140 mm in height. The mold cavity was then heated for 30 second by steam under a pressure of 0.8 Kg/cm², gage pressure. After cooling, the cellular shaped article was removed from the mold cavity.

It was found that the cellular shaped article had good quality and the particles were strongly fused to each other. The degree of fusibility was about 80 %.

COMPARATIVE EXAMPLE 1

Expandable styrene polymer particles containing n-pentane but without any coating agent, were pre-expanded in the same manner described in Example 1. All of the polymer particles were lumped, and as a result, stirring could not be continued.

COMPARATIVE EXAMPLE 2

1,000 g of expandable styrene polymer particles containing n-pentane as described in Example 1 were fed in a vessel provided with a stirrer, and 200 g of water were added to produce a slurry. To this slurry, 0.4 g of 10 % aqueous solution of sodium salt of resin acid containing abietic acid as main component was added while stirring, and the polymer particles were uniformly coated after stirring for 5 minutes.

Then 0.14 g of 10 % aqueous solution of calcium chloride was added and reacted on the surfaces of the polymer particles to produce a calcium salt of resin acid. Expandable styrene polymer particles coated by resin acid were obtained.

Pre-expanded polymer particles having a density of 0.0154 were obtained and no agglomerated particles were observed, where expansion was conducted in the pre-expander employed in Example 1.

Cellular shaped articles were obtained in the mold cavity mentioned in Example 1, from the above pre-expanded polymer particles. The degree of fusibility was about 60 %, and it was found that the cellular shaped article was not good in practical use because the fusibility of the polymer particles was disturbed.

EXAMPLE 2

(a) The process of Example 1 (a) was substantially repeated except that the following compounds were employed instead of the sodium salt of resin acid containing abietic acid as main component.

| organic compound | amount used per 100g of calcium hydroxide | average particle size |
|---|---|---|
| a-1 sodium stearate | 2 g | 0.06 – 0.15 μ |
| a-2 sodium lignin sulfonate | 5 g | 0.04 – 0.10 μ |

(b) Each of 3 g of the coated calcium carbonate produced in (a) above were coated on 1,000 g of expandable styrene polymer particles containing 6 % by weight of n-butane based on said polymer particles and 1.5 % by weight of toluene as a solvent, and having a particle size of from 0.6 to 1.2 mm in diameter, in the same manner described in Example 1. Pre-expanding and molding were carried out in the same manner described in Example 1. There were no agglomerated particles in pre-expanding step, and the degree of fusibility was almost 100 %. The resulting cellular shaped articles were excellent in practical use.

EXAMPLE 3

1,000 g of Expandable methyl methacrylate-butyl methacrylate-α-methylstyrene copolymer particles containing 3 % by weight of n-butane and 4 % by weight of n-pentane having a particle size of 0.5 – 1.0 mm in diameter were coated with 0.8 g of calcium carbonate having sodium stearate chemically attached to the surfaces thereof and as prepared by the process of Example 2 (a) above, the polymer coating being achieved in the same manner described in Example 1.

Pre-expanded polymer particles prepared by the same manner described in Example 1 having a density of 0.0180, included no agglomerated polymer particles and the degree of fusibility of the cellular shaped articles prepared in the same manner described in Example 1 was 80 %.

In order to compare with the above, ethylene-bisamide was used instead of coated calcium carbonate. In this case, 25–30 g (2.5–3.0 % by weight per polymer particles) of ethylene-bisamide were necessary to prevent agglomeration of the pre-expanded polymer particles.

COMPARATIVE EXAMPLE 3

1,000 g of expandable styrene polymer particles containing n-pentane as prepared in Example 1, were coated uniformly with 1.0 g of zinc stearate. Pre-expanded polymer particles prepared by the same manner described in Example 1 included 100 g in total amount of agglomerated polymer particles. Cellular shaped articles prepared by the same manner described in Example 1 from the above pre-expanded polymer particles excluding the part of agglomerated polymer particles, were not suitable for practical use as the degree of fusibility was only 50 %, and the fusing of the molded articles was greatly disturbed.

COMPARATIVE EXAMPLE 4

1,000 g of expandable styrene polymer particles containing n-pentane prepared in Example 1, were coated with 1.5 g of light fine pulverized calcium carbonate (Akadama made by Shiraishi Kogyo KK.) having a particle size of 1 - 3 microns in diameter and without any surface treatment. When pre-expanding them, 220 g in total amount of agglomerated particles were produced, and when molded by the same manner as described in Example 1, the degree of fusibility was only 60 %. From the above result, it was found that coating the polymer particles with calcium carbonate without any treatment is not effective.

In the case of using 1.0 g of ultra-fine pulverized calcium carbonate (Hakuenka PX made by Shiraishi Kogyo KK.) having a particle size of 0.1 micron in diameter, instead of the above mentioned calcium carbonate, the same undesirable results were obtained as above.

EXAMPLE 4

Styrene monomer was impregnated into ethylene polymer particles and subsequently polymerized therein in the presence of benzoyl peroxide, a polymerization catalyst for styrene monomer and dicumyl peroxide as a cross-linking agent for ethylene polymer, and then ethylene polymer particles containing therein polymerized styrene monomer were obtained by conventional processes, for example, as taught in U.S. Pat. No. 3,743,611.

1,000 g of expandable polymer particles containing 5.5 % by weight of butane as the expanding agent and 1.0 % by weight of toluene as an organic solvent for the above mentioned ethylene polymer particles containing therein polymerized styrene monomer having a cylindrical particle size of 5 mm in diameter and 3 mm in height were coated uniformly in a ribbon blender with 0.3 g of calcium carbonate to the surface of which was chemically attached a resin acid and prepared in accordance with Example 1 (a).

Pre-expanded polymer particles prepared by the same manner described in Example 1, having a density of 0.0286, included no agglomerated polymer particles, and the degree of fusibility of the cellular shaped articles, prepared in the same manner described in Example 1, was 95 %.

In the case of using 0.5 g of calcium carbonate to the surface of which was chemically attached a resin acid, the same desirable results were obtained.

COMPARATIVE EXAMPLE 5

1,000 g of the expandable polymer particles as described in Example 4 above were coated with 0.3 g of bisamide in the same manner as described in Example 4.

When pre-expanding the above expandable polymer particle composition, 30 g of agglomerated polymer particles were produced which would not pass through a sieve having mesh size of 15 mm. When using 0.5 g of the bisamide, agglomerated polymer particles were not found. In this case, however, cellular shaped articles prepared from these pre-expanded polymer particles did not have good quality since their degree of fusibility was only 60 %. Therefore, the use of bisamide is limited in a narrow range and practically it is not suitable to use bisamide.

EXAMPLE 5

1,000 g of expandable styrene polymer particles containing 6.0 % by weight of n-pentane as expanding agent and 1.0 % by weight of tribromophenylallyl ether as flame retardant agent, and having a particle size of 0.6 - 1.2 mm in diameter were coated uniformly in a ribbon blender with 0.5 g of calcium carbonate to the surface of which was chemically attached a resin acid and prepared in the same manner as described in Example 1 (a).

When pre-expanding the above expandable polymer particle composition in the same manner as described in Example 1, agglomerated polymer particles were not found, and cellular shaped articles prepared in the same manner as described in Example 1 had excellent quality, that is, the degree of fusibility was 90 %.

What is claimed is:

1. Expandable ethylenically unsaturated polymer particle compositions which can be pre-expanded and molded to form cellular shaped articles, which comprises ethylenically unsaturated polymer particles containing an expanding agent, said particles having the surfaces thereof coated with a layer of a compound comprising calcium carbonate, said compound having a particle size of from 0.02 to 0.2 microns and the surfaces of said calcium carbonate particles having chemically attached thereto an organic compound selected from the group consisting of higher fatty acids, resin acid, lignin sulfonic acid and alkaline metal salts thereof and mixtures thereof, said organic compound being present in an amount of from 0.5 to 6 parts by weight per 100 parts by weight of calcium carbonate, and said calcium carbonate compound being present in the amount of from 0.005% to 0.3% by weight of said polymer particles, whereby said polymer particles are substantially free of lumping or agglomerating during pre-expansion and are capable of being easily fused when molded.

2. The composition of claim 1, wherein the expanding agent is a hydrocarbon which does not dissolve or may slightly swell the said ethylenically unsaturated polymer particles, and has a boiling point lower than the softening point of the said ethylenically unsaturated polymer particles and is selected from the group consisting of propane, n-butane, isobutane, n-pentane, neopentane, isopentane, n-hexane, cyclopentane, cyclohexane, dichlorofluomethane, chlorotrifluoromethane, dichlorofluoromethane, chlorodifluoromethane, trichlorofluoromethane, methyl chloride and ethyl chloride.

3. The composition of claim 1, wherein the expanding agent is impregnated into the ethylenically unsaturated polymer particles in an amount of from 2 to 15 % by weight of the said polymer particles.

4. The composition of claim 1, wherein the ethylenically unsaturated polymer particles are polymer particles prepared by the polymerization of a vinyl monomer selected from the group consisting of styrene, methyl methacrylate and ethyl methacrylate.

5. The composition of claim 1, wherein the ethylenically unsaturated polymer particles are copolymer particles prepared by the copolymerization of a vinyl monomer selected from the group consisting of styrene, methyl methacrylate and ethyl methacrylate with a copolymerizable monomer selected from the group consisting of methyl acrylate, ethyl acrylate, butyl acrylate, methyl methacrylate, ethyl methacrylate, acrylonitrile, α-methylstyrene, divinylbenzene, 1,3-butadiene and vinyl acetate.

6. The composition of claim 1, wherein the ethylenically unsaturated polymer particles are polymer particles selected from cross-linked ethylene polymer particles and copolymer particles prepared from ethylene and styrene.

7. The composition of claim 1, wherein the higher fatty acids having from 10 to 20 carbon atoms are compounds selected from the group consisting of capric acid, lauric acid, myristic acid, palmitic acid, stearic acid, palmitoic acid, oleic acid, linolic acid, linolenic acid and alkaline metal salts thereof.

8. The composition of claim 1, wherein the resin acid is a compound which contains abietic acid, neoabietic acid, dihydroabietic acid, d-primaric acid, levo-pimaric acid, mixtures thereof and alkaline metal salts thereof.

9. The composition of claim 1, wherein the calcium carbonate has a particle size of from 0.02 to 0.2 microns in diameter and the surfaces of said calcium carbonate particles have chemically attached thereto organic compounds selected from the group consisting of higher fatty acids having from 10 to 20 carbon atoms and sodium salts thereof.

10. The composition of claim 1, wherein the calcium carbonate has a particle size of from 0.02 to 0.2 microns in diameter and the surfaces of said calcium carbonate particles have chemically attached thereto organic compounds selected from the group consisting of resin acids and sodium salts thereof.

11. The composition of claim 1, wherein the organic compound is used in an amount of from 1 to 5 parts by weight per 100 parts by weight of calcium carbonate.

12. The composition of claim 1, wherein the calcium carbonate particles having chemically attached thereto an organic compound are used in an amount of from 0.005 to 0.3 parts by weight per 100 parts by weight of the ethylenically unsaturated polymer particles.

13. The composition of claim 12, wherein the calcium carbonate particles are used in an amount of from 0.01 to 0.1 parts by weight per 100 parts by weight of the ethylenically unsaturated polymer particles.

14. A process for the preparation of expandable ethylenically unsaturated polymer particle compositions which comprises coating onto the surfaces of an expandable ethylenically unsaturated polymer particles containing an expanding agent calcium carbonate particles having chemically attached to the surfaces thereof organic compounds selected from the group consisting of higher fatty acids, resin acids and lignin sulfonic acids.

15. The process of claim 14, wherein the calcium carbonate particles are prepared by introducing carbon dioxide into a suspension medium containing calcium hydroxide.

16. The process of claim 14, wherein the calcium carbonate particles having chemically attached to the surfaces thereof organic compounds are prepared by introducing carbon dioxide into a suspension medium containing calcium hydroxide and an organic compound.

* * * * *